US010917002B2

(12) United States Patent
Oh et al.

(10) Patent No.: US 10,917,002 B2
(45) Date of Patent: Feb. 9, 2021

(54) CAPACITOR DISCHARGE DEVICE INSIDE SUB MODULE OF MMC CONVERTER

(71) Applicant: HYOSUNG HEAVY INDUSTRIES CORPORATION, Seoul (KR)

(72) Inventors: Jae Hoon Oh, Incheon (KR); Doo Young Lee, Anyang-si (KR); Ji Hoon Kim, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 370 days.

(21) Appl. No.: 15/772,999

(22) PCT Filed: Jun. 22, 2016

(86) PCT No.: PCT/KR2016/006633
§ 371 (c)(1),
(2) Date: May 2, 2018

(87) PCT Pub. No.: WO2017/078238
PCT Pub. Date: May 11, 2017

(65) Prior Publication Data
US 2018/0323698 A1 Nov. 8, 2018

(30) Foreign Application Priority Data

Nov. 3, 2015 (KR) .................. 10-2015-0153668

(51) Int. Cl.
H02H 7/00 (2006.01)
H02M 1/32 (2007.01)
(Continued)

(52) U.S. Cl.
CPC ............ H02M 1/32 (2013.01); H01H 47/223 (2013.01); H01H 50/18 (2013.01); H01H 50/44 (2013.01);
(Continued)

(58) Field of Classification Search
None
See application file for complete search history.

(56) References Cited

U.S. PATENT DOCUMENTS 8,362,784 B2 * 1/2013 Takeuchi ............... G01R 31/64
324/548
2013/0234510 A1 9/2013 Nakamura
2014/0028266 A1 1/2014 Demetriades

FOREIGN PATENT DOCUMENTS

EP 2549634 A1 1/2013
JP 10-248263 A 9/1998
(Continued)

Primary Examiner — Stephen W Jackson
(74) Attorney, Agent, or Firm — Novick, Kim & Lee, PLLC; Jae Youn Kim

(57) ABSTRACT

Provided is a capacitor discharge device that quickly and safely discharges a capacitor charged with energy inside a sub-module of an MMC converter, the device including: a capacitor storing a DC voltage inside a sub-module of an MMC converter; a power supply unit supplying operating power required in the submodule by using the voltage stored in the capacitor; a first resistor connected in parallel to the capacitor; a second resistor having a lower resistance value and a larger heat capacity than the first resistor so as to rapidly discharge the capacitor storing the voltage; a first switching contact connecting and disconnecting the capacitor and the second resistor; a switching unit operating switching of the first switching contact by the operating power; a second switching contact connecting and disconnecting the power supply unit and the switching unit; and a control unit operating switching of the second switching contact.

8 Claims, 3 Drawing Sheets

(51) Int. Cl.
*H02M 7/493* (2007.01)
*H01H 47/22* (2006.01)
*H01H 50/18* (2006.01)
*H01H 50/44* (2006.01)
*H01H 50/54* (2006.01)
H02M 7/483 (2007.01)
H02M 1/00 (2006.01)

(52) U.S. Cl.
CPC ............ *H01H 50/54* (2013.01); *H02M 7/493* (2013.01); *H02M 2001/0048* (2013.01); *H02M 2001/322* (2013.01); *H02M 2007/4835* (2013.01)

(56) References Cited

FOREIGN PATENT DOCUMENTS

| | | |
|---|---|---|
| JP | 2013-188092 A | 9/2013 |
| JP | 2013-255422 A | 12/2013 |
| KR | 10-2014-0115666 A | 10/2014 |

\* cited by examiner

CAPACITOR DISCHARGE DEVICE INSIDE SUB MODULE OF MMC CONVERTER

TECHNICAL FIELD

The present invention relates to a capacitor discharge device. More particularly, the present invention relates to a capacitor discharge device inside a sub-module of a modular multi-level converter (MMC), the device quickly and safely discharging a large-capacity capacitor charged with energy inside the sub-module of the MMC converter.

BACKGROUND ART

Recently, power systems have undergone substantial changes due to, for example, the importance of renewable energy, power quality, etc., and these changes have led to the need for devices, such as a high-voltage, direct current (HVDC) electric power transmission system, a static synchronous compensator (STATCOM), etc.

Recently, a modular configuration scheme has been newly applied to an HVDC converter or a STATCOM device. The HVDC system or the STATCOM device is not configured with a single converter having large capacity, but with a modular multi-level converter (MMC) composed of multiple modular converters having small capacity so as to be a single large system.

The MMC converter includes multiple sub-modules connected to each other in series. A large-capacity capacitor is used for each sub-module, and the MMC converter is operated by repeatedly performing charging and discharging of the large-capacity capacitor appropriately. However, if the MMC converter is maintained or overcharging occurs in the large-capacity capacitor, there is a case that energy charged in the capacitor is required to be artificially discharged. The capacitor is charged with high voltage, and thus it is impossible to perform discharge manually.

Thus, in a conventional technique, a discharge resistor is connected to the large-capacity capacitor or an external discharge device composed of a discharge resistor is in contact therewith in such a manner as to discharge the energy stored inside the capacitor.

However, in discharging through the discharge resistor, there is a problem that it takes a long time to discharge, which causes an increase in loss during operation, and thus it is impossible to actually apply the discharge resistor. Also, when the external discharge device forcibly comes into contact with the capacitor, there are problems that it is tremendously dangerous for workers and the discharge device must be provided separately, resulting in a cost increase.

DISCLOSURE

Technical Problem

Accordingly, the present invention has been made keeping in mind the above problems occurring in the related art, and an object of the present invention is to provide a capacitor discharge device inside a sub-module of an MMC converter, the device quickly and safely discharging a capacitor provided inside the sub-module of the MMC converter.

Another object of the present invention is to provide a capacitor discharge device inside a sub-module of an MMC converter, the device discharging the capacitor by using power supplied from a power supply unit (a switched-mode power supply, SMPS) of the sub-module to operate a switch in such a manner as to connect a capacitor inside the sub-module of the MMC converter with a discharge resistor.

Technical Solution

According to the present invention, a capacitor discharge device inside a sub-module of an MMC converter includes:

A capacitor discharge device inside a sub-module of an MMC converter, the device including: a capacitor storing a direction current (DC) voltage inside a sub-module of an MMC converter; a power supply unit supplying operating power required in the sub-module by using the voltage stored in the capacitor; a first resistor connected in parallel to the capacitor; a second resistor having a lower resistance value and a larger heat capacity than the first resistor so as to rapidly discharge the capacitor storing the voltage therein; a first switching contact connecting and disconnecting the capacitor and the second resistor; a switching unit operating switching of the first switching contact by the operating power supplied from the power supply unit; a second switching contact connecting and disconnecting the power supply unit and the switching unit; and a control unit operating switching of the second switching contact.

In the present invention, in an initial state of the sub-module, the first switching contact and the second switching contact may remain in an on state, respectively.

In the present invention, when the voltage stored in the capacitor increases to a preset reference voltage or more, the power supply unit may be activated and may output the operating power, and when the voltage decreases to the reference voltage or less, the power supply unit may be deactivated and output of the operating power may be blocked.

In the present invention, when the operating power is supplied to the switching unit, the switching unit may operate switching of the first switching contact to turn off the first switching contact.

In the present invention, when the supplying of the operating power to the switching unit is blocked, the first switching contact may return in the initial state and may remain in the on state.

In the present invention, before the voltage stored in the capacitor falls to the reference voltage, the control unit may operate switching of the second switching contact to turn on the second switching contact, such that the operating power from the power supply unit may be supplied to the switching unit.

In the present invention, when the supplying of the operating power to the switching unit is blocked, the first switching contact may return in the initial state and may remain in the on state.

In the present invention, the switching unit may include: a coil wound a preset number of times in a constant radius; and a metal member position inside the wound coil, wherein the metal member may be physically connected to the first switching contact, and may be linearly moved by a current flowing in the coil, such that switching of the first switching contact may be performed.

In the present invention, the metal member may be linearly moved from a preset initial position by a magnetic force generated by the current flowing in the coil, such that the first switching contact may be turned off, and when the current is blocked, the metal member may return to the initial position such than the first switching contact may be turned on.

Advantageous Effects

According to the present invention, the capacitor provided inside the sub-module of the MMC converter may be quickly and safely discharged, whereby the maintenance time for the MMC converter and the sub-module may be shortened.

Also, according to the present invention, power supplied from the power supply unit (a switched-mode power supply, SMPS) of the sub-module of the MMC converter is used to operate a switch via the control unit so as to discharge the capacitor, whereby a function of suppressing overvoltage of the capacitor may be realized in cooperation with the control unit.

MODE FOR INVENTION

Figure 1:
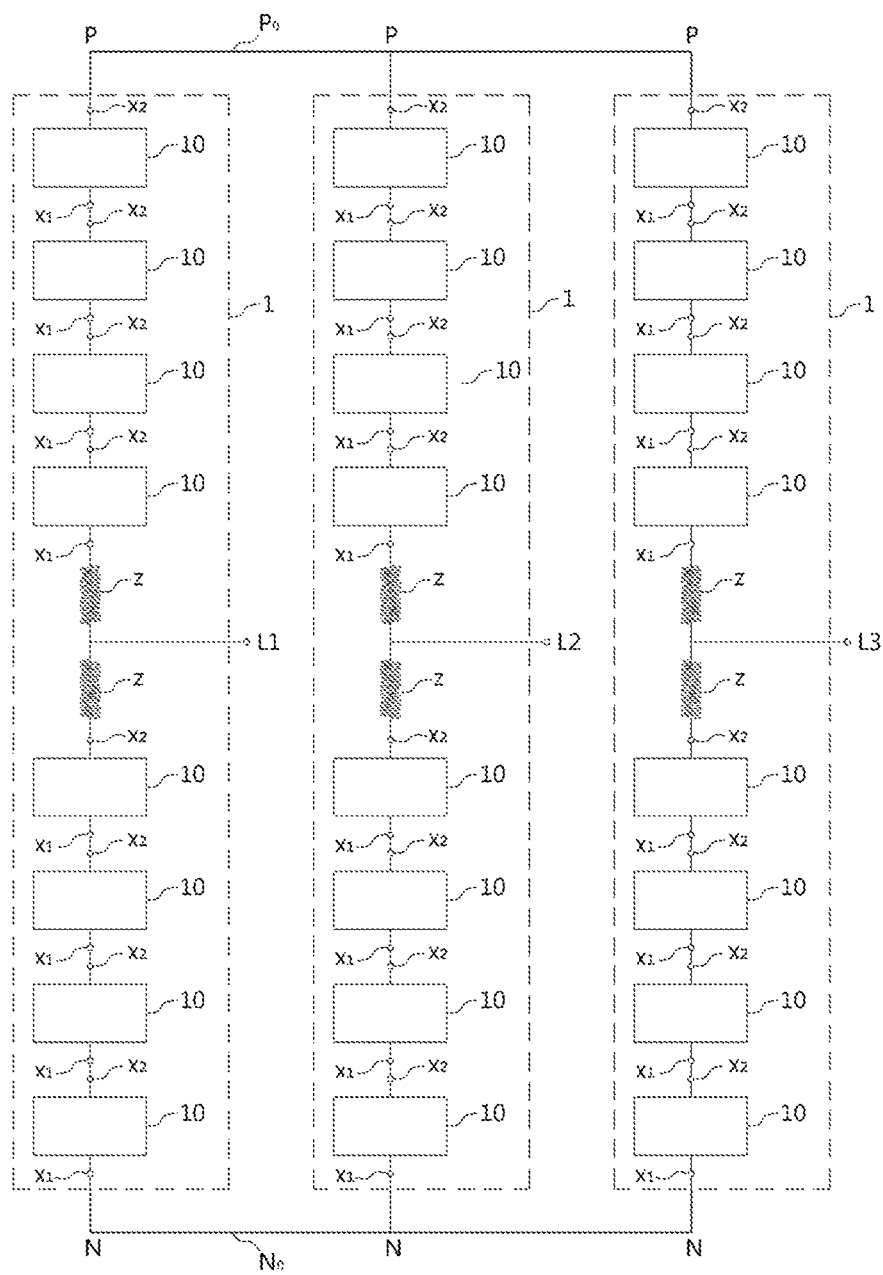
FIG. 1 is a schematic circuit diagram illustrating an MMC converter according to an embodiment of the present invention.

Hereinafter, exemplary embodiments of the present invention will be described in detail with reference to the exemplary drawings. It is to be noted that in assigning reference numerals to elements in the drawings, the same reference numerals designate the same elements throughout the drawings although the elements are shown in different drawings. Also, in the description of the present disclosure, the detailed descriptions of known related constitutions or functions thereof may be omitted if they make the gist of the present invention unclear.

Further, when describing the constituents of the present invention, terms such as first, second, A, B, (a), (b), etc. may be used. Since these terms are provided merely for the purpose of distinguishing the constituents from each other, they do not limit the nature, sequence or order of the constituents. It is to be noted that when an element is referred to as being "coupled to", "combined with", or "connected to" another element, it can be directly "coupled to", "combined with", or "connected to" the other element or intervening elements may be present therebetween.

FIG. 1 is a schematic circuit diagram illustrating an MMC converter according to an embodiment of the present invention.

As shown in FIG. 1, according to the embodiment of the present invention, the MMC converter consists of one or more phase modules 1, and in each phase module 1, multiple sub-module 10 are connected to each other in series. Also, each phase module 1 connects DC voltage sides to positive (+) and negative (−) DC voltage buses P and N, respectively. An input voltage of the P and N buses is input to each sub-module 10 through connection terminals X1 and X2. Thus, to each sub-module 10, the input voltage of the P and N buses of the MMC converter is input as increasing from zero V to a preset high voltage (e.g., three kV), and the input voltage is stored an internal capacitor. Here, for maintenance of the sub-module, etc., in order to quickly discharge the capacitor storing the high voltage therein as needed, a predetermined discharge device is required.

Figure 2:
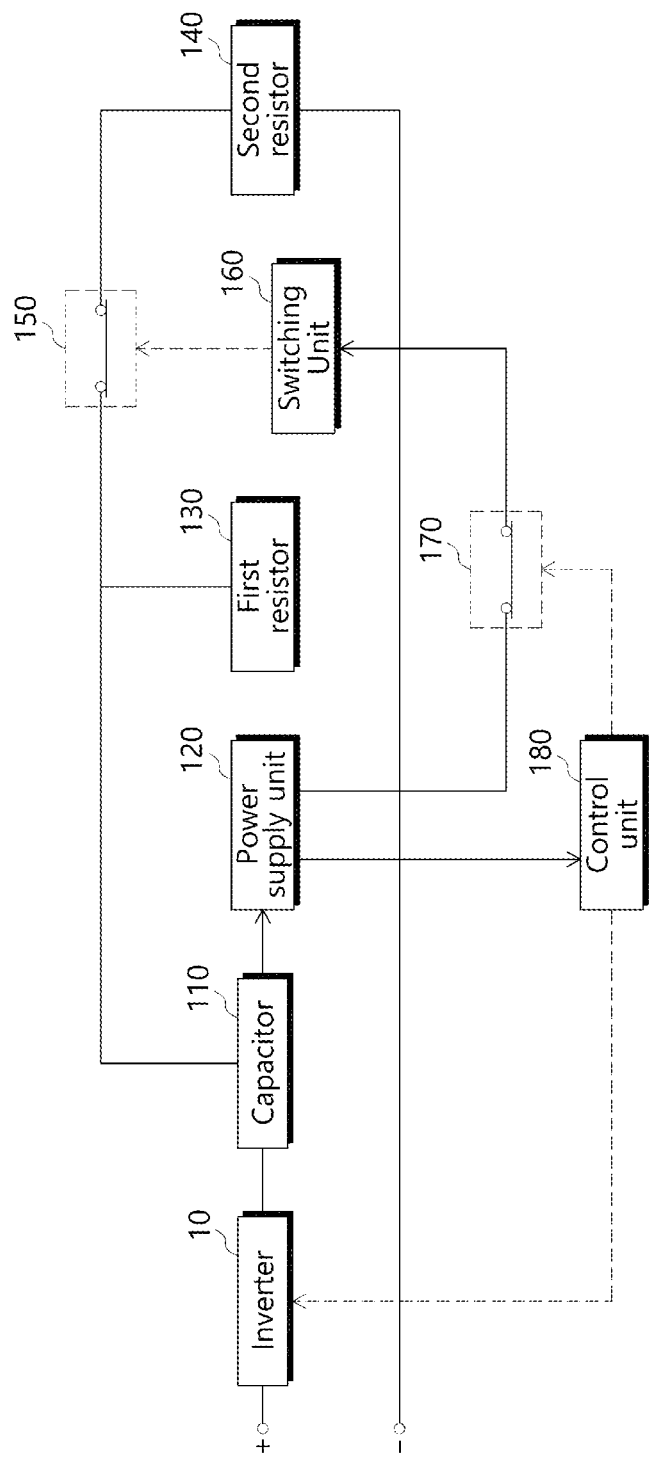
FIG. 2 is a schematic configuration diagram illustrating a capacitor discharge device inside a sub-module of an MMC converter according to an embodiment of the present invention.

FIG. 2 is a schematic configuration diagram illustrating a capacitor discharge device inside a sub-module of an MMC converter according to an embodiment of the present invention.

Referring to FIG. 2, according to the present invention, the capacitor discharge device 100 inside the sub-module of the MMC converter (hereinafter, referred to as a capacitor discharge device) includes a capacitor 110, a power supply unit 120, a first resistor 130, a second resistor 140, a first switching contact 150, a switching unit 160, and a second switching contact 170, and a control unit 180.

The capacitor 110 stores a direct current (DC) voltage output from an inverter 101 inside each of the sub-modules constituting the MMC converter. The inverter 101 adjusts energy flow with an external electrical circuit (not shown) through a terminal provided for connection with the external electrical circuit. It is desirable that the capacitor 110 applied to the sub-module of the MMC converter is provided with a large capacity to be charged with a DC voltage of about three kV or more. The capacitor 110 stores the input voltage of the P and N buses of the MMC converter. Particularly, the input voltage between the P and N buses of the MMC converter is stored in the capacitor 110 while increasing from zero V to a preset high voltage, e.g. three kV.

The power supply unit 120 supplies operating power required for various circuits and devices built in the sub-module by using the voltage stored in the capacitor 110. Here, according to the present invention, when the voltage stored in the capacitor 110 reaches a preset first voltage, the power supply unit 120 is activated to supply operating power.

The first resistor 130 is connected in parallel to the capacitor 110, and serves to perform overall energy balancing in the sub-module 10 and to slowly discharge the capacitor 110 storing the voltage therein.

The second resistor 140 has a relatively lower resistance value and a relatively larger heat capacity than the first resistor 130, and is connected in parallel to the capacitor 110 in order to rapidly discharge the capacitor 110 storing the voltage therein. For maintenance of the sub-module 10, etc., it is desirable that the second resistor 140 has a large heat capacity to rapidly discharge the capacitor 110 storing the high voltage therein. Here, as needed, the capacitor 110 with a charging voltage is gradually discharged by using the first resistor 130, but the second resistor 140 is used for rapid discharge at a faster rate than the first resistor.

The first switching contact 150 is provided between the capacitor 110 and the second resistor 140 in such a manner as to electrically connect or disconnect the capacitor 110 to or from the second resistor 140.

The switching unit 160 operates switching of the first switching contact 150 under control of the control unit 180 described later by using operating power supplied from the power supply unit 120. In the embodiment, the switching unit 160 may be realized by one of, for example, a solenoid switch, a magnetic switch, a relay switch.

The second switching contact 170 is provided between the power supply unit 120 and the switching unit 160 in such a manner as to electrically connect or disconnect the power supply unit 120 to or from the switching unit 160.

The control unit 180 receives an operating voltage from the coil 120, and operates switching of the second switching contact 170 when a preset specific condition is satisfied.

Operation of the capacitor discharge device 100 with the configuration will be described in detail.

First, in an initial state of the sub-module, the first switching contact 150 and the second switching contact 170 remain in an on state, respectively. Here, the first and the second switching contacts 150 and 170 being in the on state means that the contacts are shorted and the current flows, and being in an off state means that the contacts are opened and the current is blocked.

In the initial state, the input voltage of the P and N buses of the MMC converter is applied to the sub-module 10, and the capacitor 110 starts to be charged with a DC voltage inside the sub-module 10. It is desirable that the input voltage increases from zero V to the preset high voltage (e.g., three kV). Here, in the embodiment, when the capacitor 110 starts to be charged with the voltage and the voltage, with which the capacitor 110 is charged, increases to a preset reference voltage or more, the power supply unit 120 is activated and outputs operating power. In contrast, when the capacitor 110 charged with the voltage starts to be discharged and the voltage decreases to the reference voltage or less, the power supply unit 120 is designed to be deactivated and output of operating power is blocked. The embodiment is described as assuming that the reference voltage is, for example, DC 500 V. It is noted that the reference voltage may vary and may be differently set according to the design condition of the sub-module.

As described above, when the charging voltage of the capacitor 110 reaches the reference voltage and the power supply unit 120 is activated and outputs the operating power, the operating power is supplied to the switching unit 160 in the following step. Next, the switching unit 160 operates switching of the first switching contact 150 to turn off the first switching contact 150. Here, when the first switching contact 150 is turned off, electrical connection between the capacitor 110 and the second resistor 140 is opened such that current flow from the capacitor 110 to the second resistor 140 is blocked, and thus discharge of the capacitor 110 by the second resistor 140 does not occur. Thus, when the power supply unit 120, which supplies the operating power to various devices and elements inside the sub-module 10, is activated, the operating power is supplied and the sub-module 10 normally operates. As described above, when the sub-module 10 normally operates, the capacitor 110 is disconnected from the second resistor 140 such that discharge of the capacitor 110 by the second resistor 140 does not occur. Here, until the capacitor 110 stores up to the reference voltage (e.g., 500 V), namely, until the power supply unit 120 is activated, while storing the voltage in the capacitor 110, the first resistor 130 and the second resistor 140 are connected to the capacitor 110 such that discharge occurs. Thus, due to connection to the second resistor 140, it takes relatively longer to charge the capacitor 110 up to 500 V than the conventional technique in which connection only to the first resistor 130 is made. However, in the embodiment, since it is intended to quickly and safely discharge the capacitor 110, the slight charge time delay may be ignored.

When it is intended to stop operation of the sub-module 10 during operation so as to perform maintenance of the sub-module 10, etc., operation of the internal element or circuit of the sub-module 10 is stopped according to a preset process, thus the capacitor 110 storing the voltage therein is gradually discharged from the high voltage to zero V by the first resistor 130. Here, when the charging voltage of the capacitor 110 continues to drop and falls to the reference voltage or less, the power supply unit 120 is deactivated and output of the operating power is blocked. Therefore, the switching unit 160 no longer operates, the first switching contact 150 returns in initial state and remains in the on state. Thus, the capacitor 110 is connected to the second resistor 140 again, and the capacitor 110 charged with the voltage may be rapidly discharged via the second resistor 140. Accordingly, the second resistor 140 has a relatively lower resistance value and a relatively larger heat capacity than the first resistor 130 for rapid discharge of the capacitor 110.

Here, in another embodiment of the present invention, the capacitor 110 storing the voltage is gradually discharged by the first resistor 130, and before the voltage falls to the reference voltage (e.g., 500 V) or less, connection to the second resistor 140 may be made so as to perform quick discharge. In other words, in the above-described first embodiment, when the voltage the capacitor 110 falls to the reference voltage or less, the second resistor 140 is connected to the capacitor 110, but in the second embodiment, the second resistor 140 is connected to the capacitor 110 before the voltage of the capacitor 110 falls to the reference voltage or less, such that discharge time may be shortened.

Specifically, before the voltage stored in the capacitor 110 falls to the reference voltage or less, the control unit 180 operates switching of the second switching contact 170 and turns off the second switching contact 170, such that the operating power from the power supply unit 120 is blocked from applying to the switching unit 160. As described above, when supply of the operating power to the switching unit 160 is blocked, the first switching contact 150 returns in the initial state and remains in the on state as described above. Thus, the first switching contact 150 is turned on, and the second resistor 140 is connected to the capacitor 110, such that the capacitor 110 storing the voltage is rapidly discharged.

As described above, in the present invention, according to the voltage value stored in the capacitor 110 provided inside the sub-module of the MMC converter, the capacitor 110 storing the voltage is discharged. Here, in the present invention, due to characteristics of the sub-module of the MMC converter, on the basis of operation of the power supply unit 120 which is activated or deactivated according to the voltage value stored in the capacitor 110 inside, the capacitor 110 with the voltage is discharged. For example, when the capacitor 110 is continuously charged and the charging voltage reaches 500 V, which is activation power, of the power supply unit 120, the power supply unit 120 is activated and supplies the operating power to the internal elements and the circuit of the sub-module. Thus, when the sub-module 10 normally operates, the second resistor 140 having a relatively large heat capacity is electrically disconnected from the capacitor 110, such that discharge of the capacitor 110 by the second resistor 140 does not occur. When it is intended to stop the sub-module, the capacitor 110 with the voltage is gradually discharged via the first resistor 130 having a relatively low heat capacity. When the charging voltage falls to 500 V or less, the power supply unit 120 is deactivated, and the second resistor 140 is electrically connected to the capacitor 110, such that the capacitor 110 with the voltage is rapidly discharged by using the second resistor 140. Particularly, when it is intended to more quickly discharge the capacitor 110 before the charging voltage thereof falls to 500 V or less, the control unit 180 blocks the power supplied from the power supply unit 120 to the switching unit 160, such that the second resistor 140 is connected to the capacitor 110, thereby rapidly discharging the capacitor 110 via the second resistor 140.

Figure 3:
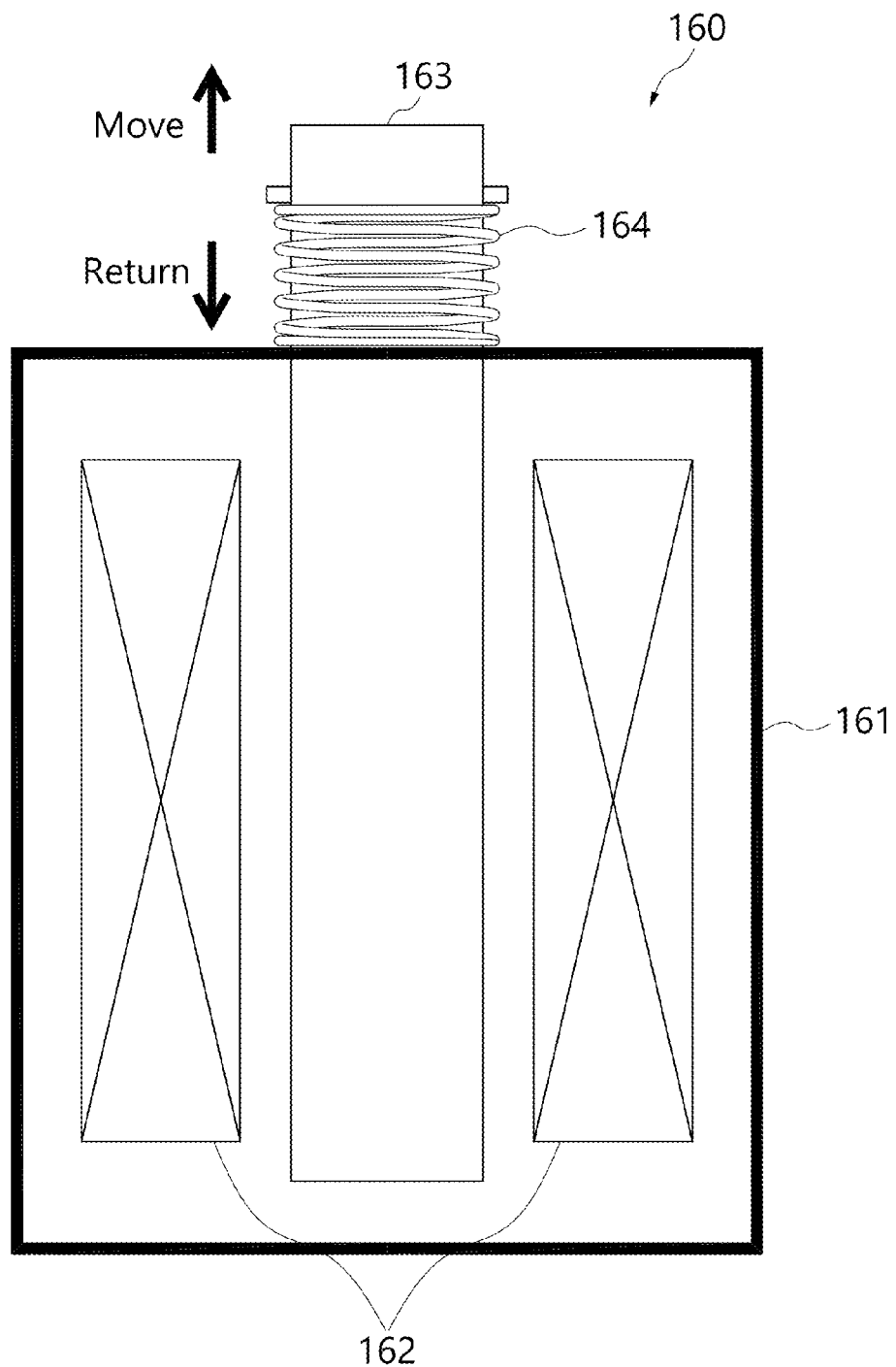
FIG. 3 is a schematic configuration diagram illustrating a switching unit according to an embodiment of the present invention.

FIG. 3 is a schematic configuration diagram illustrating a switching unit according to an embodiment of the present invention.

Referring to FIG. 3, according to the present invention, the switching unit 160 includes: a coil 162 wound a set number of times in a cylindrical form with a constant radius inside a housing 161; a metal member 163 positioned inside the coil 162; and an elastic member 164 for returning the metal member 163 to an initial position. It is described that the metal member 163 may be linearly moved to be in contact with and separated from the first switching contact 150. When power is supplied to the coil 162 and the current flows, the metal member is linearly moved from the preset initial position. When the current is blocked, the metal member returns to the initial position by the elastic member 164. Here, the initial position is a position where the first switching contact 150 remains in the on state. The elastic member 164 may be realized by, for example, a spring. Specifically, the current flowing in the coil 162 causes the metal member 163 to be linearly moved from the preset initial position in such a manner as to switch the first switching contact 150 from the on state to the off state, such that the second resistor 140 is electrically separated from the capacitor 110. Afterward, when the current is blocked from flowing in the coil 162, the metal member returns back to the initial position by the elastic member 164 in such a manner as to switch the first switching contact 150 from the off state back to the on state, such that the second resistor 140 is electrically connected to the capacitor 110. In the embodiment, the metal member 163 may be realized by, for example, a plunger.

As described above, in the present invention, by using the predetermined switching unit inside the sub-module of the MMC converter, the capacitor 110 storing the high voltage is connected to the second resistor for rapid discharge, whereby high-speed discharge is possible as needed. The configuration of the present invention for this purpose is more cost competitive than the conventional technique that requires expensive semiconductor elements. Also, the maintenance time may be shortened due to rapid discharge, and safety of maintenance work may be secured. Also, a function of suppressing overvoltage of the capacitor according to operation of the control unit may be additionally realized.

In the above description, although a description has been made such that all components constituting embodiments of the present invention are combined into a single component or are operated with the components being combined with each other, the present invention is not limited to those embodiments. That is, within the scope of the present invention, one or more of all components may be selectively combined and operated. Further, it should be understood that terms such as "comprise", "include", or "have" are merely intended to indicate that the corresponding component is internally present, unless a description to the contrary is specifically pointed out in context, and are not intended to exclude the possibility that other components may be additionally included. Unless otherwise defined, all terms including technical and scientific terms have the same meaning as commonly understood by those skilled in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description is merely intended to exemplarily describe the technical spirit of the present invention, and those skilled in the art will appreciate that various changes and modifications are possible without departing from the essential features of the present invention. Therefore, the embodiments disclosed in the present invention are not intended to restrict the technical spirit of the present invention and are merely intended to describe the present invention, and the scope of the present invention is not limited by those embodiments. The protection scope of the present invention should be defined by the accompanying claims, and all technical spirit of equivalents thereof should be construed as being included in the scope of the present invention.

The invention claimed is:

1. A capacitor discharge device inside a sub-module of an MMC converter, the device comprising:
a capacitor storing a direct current (DC) voltage inside the sub-module of the MMC converter;
a power supply unit supplying operating power required in the sub-module by using the voltage stored in the capacitor;
a first resistor connected in parallel to the capacitor;
a second resistor having a lower resistance value and a larger heat capacity than the first resistor so as to rapidly discharge the capacitor storing the voltage therein;
a first switching contact connecting and disconnecting the capacitor and the second resistor;
a switching unit operating switching of the first switching contact by the operating power supplied from the power supply unit;
a second switching contact connecting and disconnecting the power supply unit and the switching unit; and
a control unit operating switching of the second switching contact,
wherein in an initial state of the sub-module, the first switching contact and the second switching contact remain in an on state, respectively.

2. The device of claim 1, wherein when the voltage stored in the capacitor increases to a preset reference voltage or more, the power supply unit is activated and outputs the operating power, and
when the voltage decreases to the reference voltage or less, the power supply unit is deactivated and output of the operating power is blocked.

3. The device of claim 2, wherein when the operating power is supplied to the switching unit, the switching unit operates switching of the first switching contact to turn off the first switching contact.

4. The device of claim 3, wherein when the supplying of the operating power to the switching unit is blocked, the first switching contact returns in the initial state and remains in the on state.

5. The device of claim 2, wherein before the voltage stored in the capacitor falls to the reference voltage, the control unit operates switching of the second switching contact to turn on the second switching contact, such that the operating power from the power supply unit is supplied to the switching unit.

6. The device of claim 5, wherein when the supplying of the operating power to the switching unit is blocked, the first switching contact returns in the initial state and remains in the on state.

7. The device of claim 1, wherein the switching unit includes:
a coil wound a preset number of times in a constant radius; and
a metal member positioned inside the wound coil,
wherein the metal member is physically connected to the first switching contact, and is linearly moved by a current flowing in the coil, such that switching of the first switching contact is performed.

8. The device of claim 7, wherein the metal member is linearly moved from a preset initial position by a magnetic force generated by the current flowing in the coil, such that the first switching contact is turned off, and
  when the current is blocked, the metal member returns to the initial position such than the first switching contact is turned on.

\* \* \* \* \*